United States Patent
Phillips

(10) Patent No.: US 6,370,399 B1
(45) Date of Patent: *Apr. 9, 2002

(54) DETERMINATION OF MOBILE SERVICE OPTION VIA PHONE NUMBER

(75) Inventor: Marc S. Phillips, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/408,117

(22) Filed: Sep. 29, 1999

(51) Int. Cl.⁷ .................................................. H04B 1/38

(52) U.S. Cl. ........................ 455/564; 455/414; 455/556; 455/565; 455/90; 379/442; 379/456

(58) Field of Search ................................. 455/414, 466, 455/550, 575, 90, 552, 557, 556, 564, 565, 558; 379/201.19, 211.05, 216.01, 218.01, 428.04, 429, 442, 456

(56) References Cited

U.S. PATENT DOCUMENTS

| | | | | |
|---|---|---|---|---|
| 5,956,651 A | | 9/1999 | Willkie et al. ............... | 455/553 |
| 5,978,386 A | * | 11/1999 | Hamalainen et al. ....... | 370/466 |
| 6,009,088 A | * | 12/1999 | Taguchi et al. ............. | 370/338 |
| 6,097,733 A | * | 8/2000 | Basu et al. .................. | 370/468 |
| 6,192,041 B1 | * | 2/2001 | Phillips ...................... | 370/338 |

FOREIGN PATENT DOCUMENTS

| | | |
|---|---|---|
| WO | WO 97/28661 | 8/1997 |
| WO | WO 98/54918 | 12/1998 |
| WO | WO 00/04691 | 1/2000 |

OTHER PUBLICATIONS

Data Service Options for Spread Spectrum Systems: AT Command Processing and the $R_m$ Interface. TIA/EIA/IS–707–A.3 (PN–4145.3) (Mar. 1999).

* cited by examiner

Primary Examiner—Dwayne Bost
Assistant Examiner—Charles Craver
(74) Attorney, Agent, or Firm—Philip R. Wadsworth; Charles D. Brown; George C. Pappas

(57) ABSTRACT

A system and method for selecting from a plurality of data service options in a wireless communication system having mobile data service support. The system comprises a terminal device includes a terminal device for originating a call and transmitting and receiving data in accordance with a selected data service option. The terminal device includes a communications interface for inputting a sequence of one or more alpha-numeric characters representing an AT dial command string in order to originate the call and for including information that indicates the selected data service option. The system also includes a communication device, coupled to the terminal device, for interfacing with the wireless communication system and for sending signaling messages to the terminal device. The communication device receives the AT dial command string from the terminal device and examines the contents of the received AT dial command string. The communication device compares the contents of said AT dial command string with stored predetermined alpha-numeric character sequences. These character sequences include standard telephone numbers and reserved telephone numbers representing different data service options. The communication device determines whether a match exists between the inputted sequence and the stored reserved telephone numbers. If a match does exist, the communication device signals the terminal device to transmit data in accordance with the selected data service option indicated by the reserved telephone number.

20 Claims, 6 Drawing Sheets

Service Option Format

| Proprietary Indicator | Service Option Revision | Base Service Option Number |
|---|---|---|
| 1 bit | 3 bits | 12 bits |

FIG. 4

CDMA AT+CRM Parameter Commands

| Command | Description | | Async & Fax | Packet Data | STU III |
|---|---|---|---|---|---|
| +CRM=<value> | Set $R_m$ interface protocol. | | required & local command | required command | required command |
| | 0 | Asynchronous Data or Fax | | | |
| | 1 | Packet data service, Relay Layer $R_m$ interface | | | |
| | 2 | Packet data service, Network Layer $R_m$ interface, PPP | | | |
| | 3 | Packet data service, Network Layer $R_m$ interface, SLIP | | | |
| | 4 | STU-III Service | | | |
| | 5-127 | Reserved for future use | | | |
| | 128-255 | Reserved for manufacturer specific use | | | |

FIG. 5

| CDMA Data Service | Service Option | Base Service Option Number |
|---|---|---|
| async | 4 | 4 |
|  | 4100 | 4 |
|  | 12 | 12 |
| fax | 5 | 5 |
|  | 4101 | 5 |
|  | 13 | 13 |
| packet data bearer | 7 | 7 |
|  | 4103 | 7 |
|  | 8 | 8 |
|  | 4104 | 8 |
|  | 15 | 15 |
|  | 16 | 16 |
| STU III | 10 | 10 |
|  | 11 | 11 |

FIG. 6

DETERMINATION OF MOBILE SERVICE OPTION VIA PHONE NUMBER

BACKGROUND OF THE INVENTION

1. Field of the Invention

This invention generally relates to the field of wireless communications. More particularly, the present invention relates to a novel and improved method and system for determining the selection of a mobile service data option in a wireless communications network having data service support.

2. Description of Related Art

Recent innovations in wireless communication and computer-related technologies, as well as the unprecedented growth of Internet subscribers, have paved the way for mobile computing. In fact the popularity of mobile computing has placed greater demands on the current Internet infrastructure to provide mobile users with more support. One crucial part of meeting these demands and providing users with such support is the use of Code Division Multiple Access (CDMA) technology in wireless communication systems.

CDMA technology has been used in military and intelligence-gathering satellite communication systems for decades. However, only recently has CDMA's potential for wireless commercial communication applications been exploited. Unlike conventional analog and digital communication systems, which divide the available frequency spectrum into narrow channels and assign conversations to each channel, CDMA systems assign a unique code to each conversation and spread the plurality of simultaneous conversations across a wideband spread spectrum bandwidth. As long as the receiving apparatus has the correct code, it can successfully detect and select its conversation from the other conversations concurrently transmitted over the same bandwidth in the CDMA system. The standard for CDMA (i.e., spread spectrum) wideband wireless communication systems is generally provided by the Telecommunications Industry Association/Electronics Industries Association Interim Standard 95 (TIA/EIA IS-95), entitled "MOBILE STATION-BASE STATION COMPATIBILITY STANDARD FOR DUAL-MODE WIDEBAND SPREAD SPECTRUM CELLULAR SYSTEM", published in July 1993 and herein incorporated by reference.

Even more recently, CDMA technology has been recognized as ideal for accommodating data service traffic as well. In fact, TIA/EIA IS-707, as defined in "DATA SERVICE OPTIONS FOR WIDEBAND SPREAD SPECTRUM SYSTEMS", published in February 1998 and herein incorporated by reference, provides a suite of data service options within a wireless CDMA communication network. This standard includes circuit-switched data/modem emulation services, such as asynchronous data, Group m facsimile, and secure telephone units (STU-III) applications. In addition, it includes packet-switched services, such as Internet-related e-mail and web-browsing capabilities.

These services enable mobile users to use their laptop or palmtop computers to access the Internet. To wit, just as stationary users conventionally employ "wired" communication devices to connect their desktop computers to land-based networks, mobile users can use wireless communication devices (MT2 devices) to connect their mobile laptops to such networks. As used herein, an MT2 device refers to any subscriber station in the wireless communication network that is can be used while in transit or during halts at unspecified points. MT2 devices include portable units (e.g., hand-held personal phones) and units permanently installed in vehicles (e.g., installed mobile phone units), as well as wireless local loop (WLL) telephones.

FIG. 1 illustrates a high-level block diagram of a wireless data communication system in which mobile terminal equipment TE2 device 102 (e.g., laptop or palmtop computer), communicates with an Interworking Function (IWF) 108 via a wireless communication system. The wireless communication system includes a wireless communication device MT2 device 104 and a Base Station/Mobile Switching Center (BS/MSC) 106. The IWF 108 serves as the access point or gateway to the Internet. An L interface couples IWF 108 to BS/MSC 106. Often the IWF 108 will be co-located with the BS/MSC.

The TE2 device 102 is electronically coupled to the MT2 device 104 via the $R_m$ interface. The MT2 device 104 communicates with the BS/MSC 106 via the wireless interface $U_m$. The TE2 device 102 and the MT2 device 104 may be integrated into a single unit or maybe separated out, as in the case of an installed mobile phone unit in which a laptop operates as the TE2 device 102 and the transceiver operates as the MT2 device 104. The combination of the TE2 device 102 and the MT2 device 104, whether integrated or separate, is also referred to as a mobile station (MS)103.

As stated above, CDMA Data Service Options offers direct Internet access via its packet-switch functionality. Specifically, TIA/EIA IS-707.5, entitled "DATA SERVICE OPTIONS FOR WIDEBAND SPREAD SPECTRUM SYSTEMS: PACKET DATA SERVICES," published in February 1998 and herein incorporated by reference, defines requirements for support of packet data transmission capability on TIA/EIA IS-95 wideband spread spectrum systems. IS-707.5 specifies a packet data bearer service that may be used for communication between TE2 device 102 and IWF 108 via BS/MSC 106 and provides procedures that can apply to multiple packet data services.

In particular, the IS-707.5 standard specifies the Packet Data Service options that may be used to communicate between the TE2 device 102 and IWF 108 via BS/MSC 106. In doing so, IS-707.5 introduces two protocol option models, which specify the packet data protocol requirements for the $R_m$ interface, $U_m$ interface, and the L interface. FIG. 2 depicts one of the protocol option models, the Relay Layer Interface Protocol Option model 200, in which the application running on the TE2 device 102 manages the packet data as well as the network addressing.

At the far left of FIG. 2 is a protocol stack, shown in conventional vertical format that depicts the protocol layers running on the TE2 device 102. At the top of the TE2 protocol stack lies the application layer 202. For mobile users accessing the Internet through Packet Data Service options, the communications applications software such as web browser programs (e.g., Netscape Navigator™, Microsoft Internet Explorer™ etc.) and e-mail/messaging programs (e.g., Eudora®) comprise the application layer 202 of the TE2 device 102.

As depicted in FIG. 2, the transport layer protocol 204 of the TE2 device 102 maybe the Transmission Control Protocol (TCP). TCP is defined in Request for Comment 793 (RFC 793) entitled, "TRANSMISSION CONTROL PROTOCOL: DARPA INTERNET PROGRAM PROTOCOL SPECIFICATION", published in September 1981 and herein incorporated by reference. Essentially, TCP provides a reliable transport service to all applications. TCP manages the assembly of messages coming from the TE2 device 102 into packets or datagrams that are transmitted over the Internet.

Alternatively, the transport layer protocol 204 of the TE2 device 102 may implement the User Datagram Protocol (UDP). UDP is defined in Request for Comment 768 (RFC 768) entitled, "USER DATAGRAM PROTOCOL", published in August 1980 and incorporated by reference. Like TCP, UDP provides a transport service to all applications. However, instead of assembling the messages coming from the TE2 device 102 into packets or datagrams, UDP relies on the application itself to ensure that the messages arrive and that they do so in sequence.

The network layer protocol 206 of the TE2 device 102 is the Internet Protocol (IP), is defined in Request for Comment 791 (RFC 791) entitled, "INTERNET PROTOCOL: DARPA INTERNET PROGRAM PROTOCOL SPECIFICATION", published in September 1981 and herein incorporated by reference. The IP protocol is the life-blood of the Internet as it handles the addressing and routing functionality for all Internet communications. It achieves this by affixing a 32-bit address to the header of packets, so as to ensure that the packets get to the right destination. Each computer on the network checks the IP address to see where to forward the IP packets.

The link layer protocol 208 of the TE2 device 102 is the Point-to-Point Protocol (PPP) which is described in detail in Request for Comments 1661 (RFC 1661), entitled "THE POINT-TO-POINT PROTOCOL (PPP)", dated May 1992, and herein incorporated by reference. The PPP protocol is a link layer protocol used to configure, test, and establish the data link connection. The PPP protocol encodes packets coming from upper protocol layers of the TE2 102 device. In order to transmit these IP packets over a serial line link (i.e., TIA/EIA 232-F interface between the TE2 device 102 and the MT2 device 104), and presumably gain a dial-up connection, the PPP protocol encodes the IP packets and "serializes" them to facilitate transmission.

Finally, FIG. 2 illustrates that the TE2 protocol stack is logically connected to the protocol stack of the MT2 device 104 over the $R_m$ interface through the relay layer protocol 210. The $R_m$ interface complies with the TIA/EIA-232-F standard, entitled "INTERFACE BETWEEN DATA TERMINAL EQUIPMENT AND DATA CIRCUIT-TERMINATING EQUIPMENT EMPLOYING SERIAL BINARY DATA INTERCHANGE", published in October 1997 and herein incorporated by reference.

Central to the Relay Layer Interface Protocol Option model is the notion that the principal link layer connection is established between the TE2 device 102 and the IWF 108. The TE2 device 102 is responsible for all aspects of packet data and network address management. As such, the MT2 device 104 simply behaves as a pipe transmitting the TE2 device 102 frames over the $U_m$ interface and the IWF 108 frames over the $R_m$ interface. Therefore, Internet access is achieved without dialing telephone numbers, waiting for modem training/handshaking, or incurring overhead data costs to ensure reliability.

Alternatively, CDMA Data Service Options offer circuit-switched data/modem emulation services, such as Asynchronous Data Services and Fax Services. These service options essentially follow the protocol flow of conventional modem/facsimile dial-up communications. For example, to gain Internet access, mobile users,much like their desktop computer counterparts, use their TE2 devices 102 with application software, having dial-up communication capabilities, to establish a serial communications link to an Internet Service Provider's (ISP) modem. Specifically, TIA/EIA IS-707.4, entitled "DATA SERVICE OPTIONS FOR WIDEBAND SPREAD SPECTRUM SYSTEMS: ASYNC DATA AND FAX SERVICES," published in February 1998 and herein incorporated by reference, defines requirements for support of async and fax services on TIA/EIA IS-95 wideband spread spectrum systems.

An exemplary embodiment of the IS-707.4 Async Data and Fax Services is illustrated in FIG. 3, which depicts the protocol stacks in each of the wireless communication entities. Under the IS-707.4 standard, the application layer 302 includes the communications application software running on the TE2 device 102. Typically, the communications application software includes a user dial-up interface. Dial-up interfaces, being "user-friendly", allow the user to identify the type of serial MT2 device 102 connected to the TE2 device 102 as well as accommodating the entry of telephone numbers (e.g., an ISP's modem telephone number) and use name/password scripts to originate a call The dial-up interface generally incorporates a dial-up engine which receives the telephone number inputted by the user and translates it into a command string. An exemplary command string is the AT dial command string that is compliant with the Hayes® Standard AT Command Set language. Examples of such AT dial command strings are: "ATDT 5551234" and "ATDT#777". Artisans of ordinary skill will readily appreciate, however, that other interfaces may be used to generate command strings other than AT dial command strings with equal effect.

Responsive to the AT dial command string, the MT2 device 104 brings up an async call by first configuring a TCP-based connection to the BS/MSC 106 and then actuating the dialing operation of the telephone number included in the dial string command. The MT2 device 104 configures the TCP protocol 304 by opening a connection and specifying that the network layer protocol, IP 306, will be used for message transport. The IP protocol 306 transmits the TCP packets to the IP address specified.

After dialing, the MT2 device 104 must perform handshaking and training operations with the remote ISP modem 336 to establish the call The dial-up engine waits for the MT2 device 104 to send a "Connect" message back to the TE2 device 102, signifying that it has connected to the remote ISP modem 336. The Connect message then prompts the communication application software on the TE2 device 102 to commence the serial transmission of IP packets.

Each of the CDMA Data Service Options is identified by the Service Options defined in TIA/EIA IS-707.1. As illustrated in FIG. 4, the Service Options format includes a base service option number field which indicates the base data service (e.g., asynchronous data service, facsimile service, packet data bearer service, or secure telephone unit service). The Base Service Option Number identifies base data services, such as async data, fax, packet data, etc. The Service Option Revision identifies the data service features set. The first feature set for any base data service is assigned Service Option Revision 0, the next is assigned Service Option Revision 1, and so on, up to Service Option Revision 7.

FIG. 6 lists the Service Options used by CDMA data services. The Base Service Option Numbers 4 and 12 support async applications; Base Service Option Numbers 5 and 13 support fax applications; Base Service Option Numbers 7 and 15 support Internet Protocol (IP) and Connection less Network Protocol (CLNP) networks; Base Service Option Numbers 8 and 16 support the Cellular Digital Packet Data (CDPD) network; and Base Service Option Numbers 10 and 11 provide a secure traffic bearer service for digital U.S. Government STU III terminals.

The requirements for the $R_m$ interface, CDMA Data Service Option selections, and the AT dial command processes are defined in TIA/EIA IS-707.3, entitled "DATA SERVICE OPTIONS FOR WIDEBAND SPREAD SPECTRUM SYSTEMS: AT COMMAND PROCESSING AND THE Rm INTERFACE," published in February 1998 and herein incorporated by reference. The IS-707.3 standard specifies that the selection of either the base service options or base service features is controlled through the mobile station through the Hayes® Standard AT Command Set language. As illustrated in FIG. 1, a MS 103 includes a TE2 device 102 connected to an MT2 device 104 via the $R_m$ interface. The TIA/EIA IS-707.3 standard presumes that a user, originating a call on a MS 103, selects the desired CDMA Data Service Options by configuring the "AT+CRM" parameters. FIG. 5 lists a subset of AT+CRM parameter commands for the CDMA Data Service Options. The default value for the AT+CRM parameter is zero if the value is supported by the MT2 device 104. If zero is not supported, the default value shall be manufacturer-specific.

A limitation of the CDMA Data Services Options, under the IS-707.3 standard, is its reliance on mobile users to enter the AT+CRM commands. In other words, to select the desired CDMA Data Service Options and features, the user must configure his selection through an unspecified interface on the TE2 device 102. The actual configuration of the AT+CRM parameter value may prove both inconvenient and challenging given the variety of options and parameters from which to choose. For example, if the call-originating user desires to bring up a particular packet data call (e.g., Mobile IP, Simple IP, Cellular Digital Packet Data, etc.) the user will not only have to decide which base service to choose, but also how to configure the AT dial commands to specify the desired options and features associated with that call.

Moreover, mobile users would have to engage unfamiliar interfaces and execute different procedures depending on their desired CDMA Data Service Option. For example, even though users maybe familiar with the application's communication user interface for configuring an async call or modem emulation (i.e., IS-707.4 applications), users would have to manipulate other interfaces to establish other CDMA Data Service Option calls such as a packet data call.

One proposed solution, as presented in U.S. patent application Ser. No. 08/593,222, entitled "Automatic Data Service Selection" by James Wilkie, assigned to the assignee of the instant application, and herein incorporated by reference, automates the selection process of CDMA Data Service Options for a packet data call. Specifically, the proposed solution forces the selection of Packet Data Services whenever the MT2 104 device detects a Point-to-Point Protocol (PPP) encapsulated packet on the $R_m$ link (See generally, Request for Comments 1661 [RFC 1661], entitled "THE POINT-TO-POINT PROTOCOL). This automatic selection occurs regardless of the AT+CRM parameter setting. Although this solution assists in selecting the Base Service Option, it still does not address the numerous options available within a particular service or their associated features. As such, the solution may not be able to uniquely identify all the desired CDMA Data Service Options.

What is needed is a system and method, that are both familiar and user-friendly, for a wireless communication device to determine mobile service options in a wireless communication system.

SUMMARY OF THE INVENTION

Systems and methods consistent with the principles of the present invention address the need identified above by providing a familiar and user-friendly system for determining the mobile data service option desired by a call-originating mobile user.

A system and method, consistent with the principles of the present invention as embodied and broadly described herein, includes a terminal device for originating a call and transmitting and receiving data in accordance with a selected data service option. The terminal device includes a communications interface for inputting a sequence of one or more alpha-numeric characters representing an AT dial command string in order to originate the call and for including information that indicates the selected data service option. The system also includes a communication device, coupled to the terminal device, for interfacing with the wireless communication system and for sending signaling messages to the terminal device. The communication device receives the AT dial command string from the terminal device and examines the contents of the received AT dial command string. The communication device compares the contents of said AT dial command string with stored pre-determined alpha-numeric character sequences. These character sequences include standard telephone numbers and reserved telephone number sequences representing different data service options. The communication device determines whether a match exists between the inputted sequence and the stored reserved telephone number sequences. If a match does exist, the communication device begins operating in a mode consistent with the selected data service option associated with the reserved telephone number sequence.

BRIEF DESCRIPTION OF THE DRAWINGS

The accompanying drawings, which are incorporated in and constitute a part of this Specification, illustrate an embodiment of the invention and, together with the description, explain the objects, advantages, and principles of the invention. In the drawings:

FIG. 4 describes the CDMA Data Service Options format as defined in TIA/EIA IS-707.1.

FIG. 5 describes the CDMA AT+CRM Command Parameters.

FIG. 6 describes the CDMA Data Service Options, Service Options, and Base Service Option numbers.

DETAILED DESCRIPTION OF THE PREFERRED EMBODIMENTS

The following detailed description of the present invention refers to the accompanying drawings that illustrate preferred embodiments consistent with this invention. Other embodiments are possible and modifications maybe made to the embodiments without departing from the spirit and scope of the invention. Therefore, the following detailed description is not meant to limit the invention. Rather the scope of the invention is defined by the appended claims.

The present invention takes advantage of protocols and standards which govern the communications between the TE2 device 102 and the MT2 device 104, as well as existing software/interface applications, to determine what type of CDMA Data Service Option call should be invoked by the MT2 device 104.

It will be apparent to one of ordinary skill in the art that the present invention as described below may be implemented in many different embodiments of software, firmware, and hardware in each of the entities illustrated in the figures. For example, the TE2 device 102 may be a laptop computer equipped with a processing unit that executes communications software utilizing a user interface. Such a user interface maybe used for entering AT dial command strings to control/configure outgoing calls. Similarly, the MT2 device 104 may contain a processing unit that monitors, compares, and otherwise processes outgoing call information coming from the TE2 device 102. Such call information may include configuration and operation information corresponding to the type of call to be originated by MT2 device 104, such as a particular CDMA Data Service Option. The MT2 device 104 may also contain hardware storage/memory components for storing preselected alpha-numeric characters corresponding to telephone numbers to facilitate speed dialing operations. These memory components may also store reserved telephone number sequences corresponding to link information, such as CDMA Data Service Options.

It is noted that the actual software code or control hardware used to implement the present invention is not limiting of the present invention. Thus, the operation and behavior of the present invention will be described without specific reference to the actual software code or hardware components. This non-specific is possible because it is clearly understood that a person of ordinary skill in the art would be able to design software and control hardware to implement the preferred embodiment of the present invention based on the description included herein.

Figure 1:
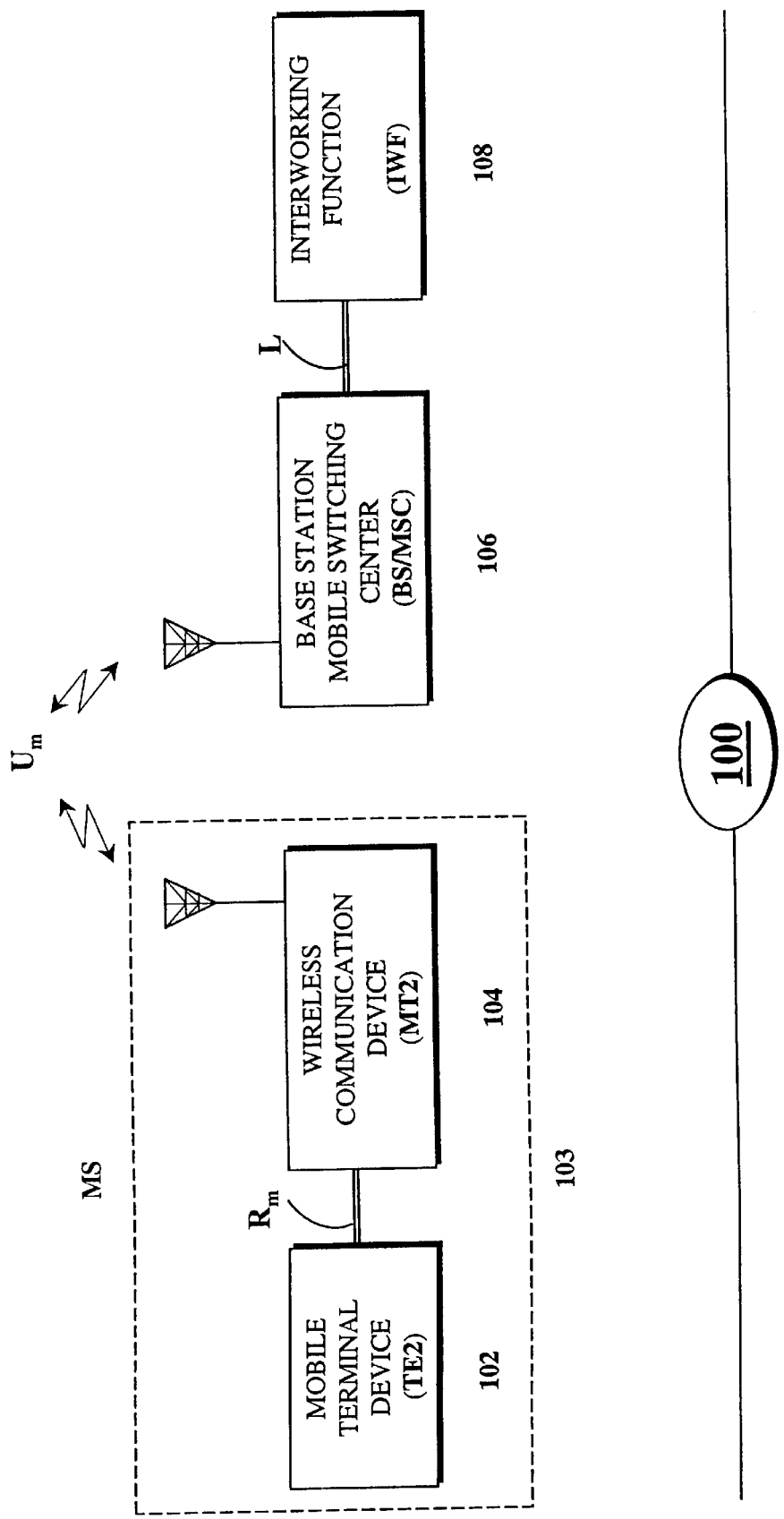
FIG. 1 is a high level block diagram of a wireless communication system in which a terminal device connects to the Internet via a wireless communication device.
Figure 2:
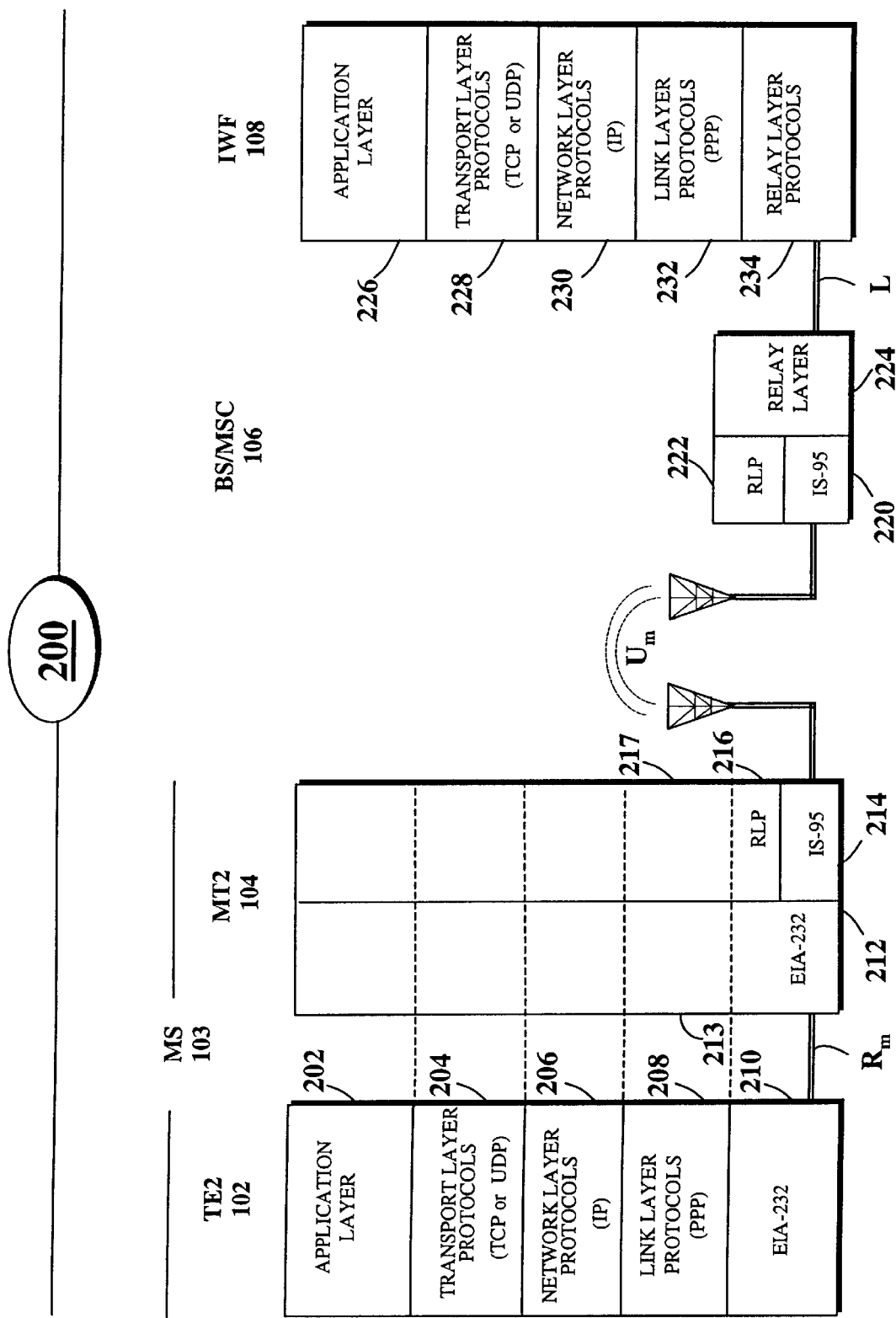
FIG. 2 schematically describes the protocol stacks in each entity of the TIA/EIA IS-707.4 Relay Model.
Figure 3:
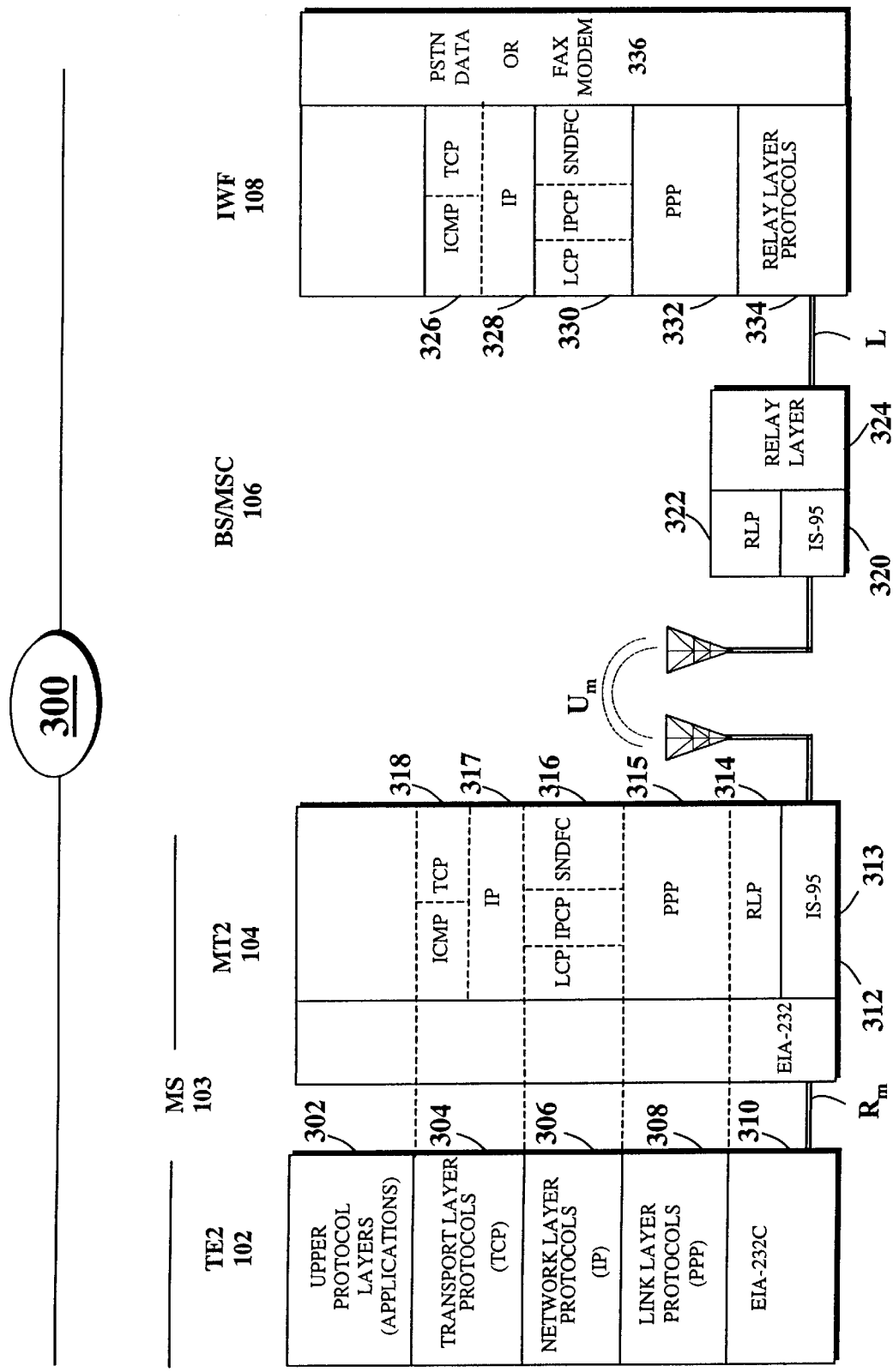
FIG. 3 schematically describes the protocol stacks in each entity of the TIA/EIA IS-707.5 Relay Model.
Figure 7:
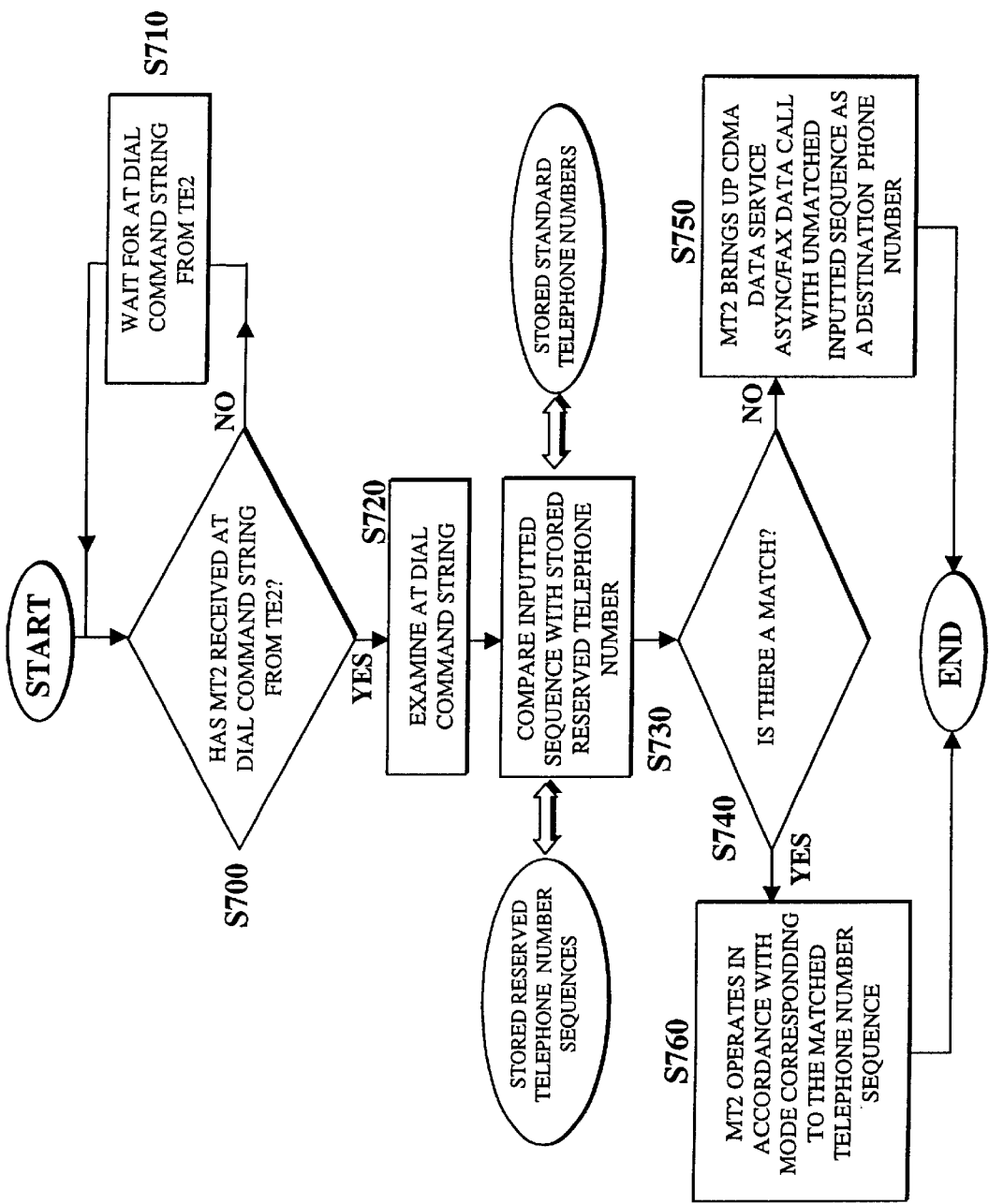
FIG. 7 is a high-level flow diagram depicting the operation of an embodiment of the present invention.

FIG. 7 is a high-level flow diagram describing the operation of an embodiment of the present invention. The embodiment presumes that a mobile user endeavors to originate a call with a particular CDMA Data Service Option. The user selects the desired CDMA Data Service Option by entering a reserved telephone number sequence in the dial-up interface of a communications software application. The reserved telephone number sequence directly corresponds to a desired CDMA Data Service Option. Unlike the unspecified interface of IS-707.3, the reserved telephone number sequence is inputted on a familiar TE2 device 102 interface, such as the communications software dial-up interface discussed above with respect to conventional modem communications. After the user completes the reserved telephone number sequence input step, the TE2 device 102 formats and sends the AT dial command string, via the TIA/EIA 232-F $R_m$ interface, to the MT2 104 device.

As depicted in FIG. 7, the MT2 device 104 first queries whether it has received an AT dial command string from the TE2 device 102, as in step S700. If it as not, the MT2 device 104 waits for the AT dial command string, as in step S710. If it has received an AT dial command string, the MT2 device 104 progresses to step S720.

In step S720, the MT2 device 104 examines the AT dial command string and extracts the alpha-numeric sequence included therein. The MT2 device 104 stores pre-selected alpha-numeric characters representing both standard telephone numbers and reserved telephone number sequences. As stated above, the reserved telephone number sequences correspond to different Data Service Options and can be arranged and stored as if they were standard telephone numbers. For example, the reserved telephone number sequences might be stored in a manner comparable to the storage of telephone numbers in speed dialing operations.

In step S730, the MT2 device 104, compares the alpha-numeric sequence extracted from the AT dial command string to the reserved telephone numbers which include stored standard telephone numbers and stored reserved telephone number sequences.

In step S740, the MT2 device 104 determines whether there exists a match between the alpha-numeric sequence extracted from the AT dial command string and the reserved telephone number sequences. If a match does not exist, as in step 5750, the MT2 device 104 brings up a CDMA data call pursuant to the current+CRM setting which, by default is the IS-707.4 CDMA Async/Fax Service call Accordingly, the MT2 device 104 dials out the unmatched inputted sequence as a destination telephone number for a CDMA Async/Fax Service call. Upon successfully establishing the dial-up link, the MT2 device 104 then signals the TE2 device 102 that it has connected in order to commence the transmission of data in accordance with CDMA Async/Fax Services. If a match does exist between the extracted sequence and the reserved telephone number sequence, the MT2 device 104 progresses to step S760.

In step S760, the MT2 device 104 operates in accordance with the mode corresponding to the information specified in the matched reserved telephone number sequence. For example, in an exemplary embodiment, the MT2 device 104 immediately brings up an IS-707 CDMA Data Service Option call in response to a match between extracted sequence and the reserved telephone number sequence. In bringing up the specified call, the MT2 device 104 configures the link on its end, and transmits the link information to the Base Station or Mobile Switching Center 106, accordingly Regardless of the selected CDMA Data Service Option, the MT2 device 104 subsequently informs the TE2 device 102 that it has established a communications link and is connected. This will trigger the TE2 device 102 to begin sending data consistent with the selected CDMA Data Service Option. Moreover, in an alternative embodiment, a match between the extracted sequence and reserved telephone number sequence may not immediately bring up an IS-707 CDMA Data Service Option call; rather, the MT2 device 104 may delay bringing up the call until the occurrence of a predetermined event, such as a timer, a character count, or the detection of a triggering packet, for example.

By way of illustrating an embodiment of the present invention, suppose a mobile user, operating within a wireless communications network with CDMA Data Service Option support, wishes to establish a packet data call. The user originates the call by inputting the alpha-numeric character sequence "#777" into a communications dial-up interface running on a mobile laptop. For this example, the inputted character sequence "#777" is designated as a reserved telephone number sequence signifying the CDMA Packet Data Service option (e.g., service options 7 and 15). The wireless communication phone, coupled to the mobile laptop, examines the dialed AT dial command string coming from the laptop, extracts the alpha-numeric sequence, and compares the extracted sequence, "#777" to the set of stored reserved telephone numbers. Upon detecting a match between the inputted "#777" sequence and the stored reserved telephone number sequence, the phone, consistent with the dial-up procedures, informs the laptop that the phone is "connected" to a remote modem even though the selected service is not the Async/Data Service Option. This connection triggers the laptop to begin sending packets to the phone, thereby establishing the desired packet data call.

This invention, therefore, provides a system for selecting a CDMA Data Service Option that employs a familiar user interface to effect the type of call to be brought up by the wireless communication device. This way, users do not need to have different interfaces and procedures for originating different types of CDMA calls. The user only needs to acquaint himself with one user interface, and only remember the reserved telephone number sequences (preferably a telephone number format) to originate any CDMA Data Service Option call. This system may store a plurality of reserved telephone numbers. Alternatively, the reserved telephone numbers could be predetermined by the carrier, or they could be configurable through the standard AT dial command set language or equivalent. Moreover, the reserved telephone numbers need not be limited to alpha-numeric sequences, but can take the form any symbol reproduced by a standard keyboard to a computer.

Another embodiment of the invention is directed to Wireless Local Loop phone systems (i.e., WLL phones) equipped with Rj-11 jacks. For example, the WLL phones could examine the DTMF tones that enter on its RJ-11 port Similar to the previous embodiment of the invention, the WLL phone can examine the tones, extract the inputted alpha-numeric sequences, and compare with a set of stored sequences. The WLL phone can then match the inputted sequence to a stored sequence to determine what type of CDMA Data Service Option call to bring up.

The foregoing description of preferred embodiments of the present invention provides illustration and description, but is not intended to be exhaustive or to limit the invention to the precise form disclosed. Modifications and variations are possible consistent with the above teachings or may be acquired from practice of the invention. The scope of the invention is defined by the claims and their equivalents

What is claimed:

1. A system for selecting from a plurality of data service options in a wireless communication network having mobile data service support, said system comprising:
   a terminal device for originating a call and for transmitting and receiving data in accordance with a selected data service option, said terminal device including a dialing interface for inputting a sequence of one or more symbols representing a dial command string for originating said call, said input symbol sequence includes information indicating a selection of a data service option; and
   a communication device, coupled to said terminal device, for receiving said dial command string from said terminal device, for storing a plurality of predetermined symbol sequences including standard telephone numbers and reserved telephone number sequences representing different data service options, and for comparing contents of said dial command string with said stored predetermined symbol sequences,
   wherein said communications device operates in accordance with said selected data service option when said communication device determines that said contents of said dial command string may access one of said reserved telephone number sequences.

2. The system set forth in claim 1, wherein said selected data service option is one of asynchronous data service and facsimile service when said communication device determines that said dial command string contents does not match one of said reserved telephone number sequences.

3. The system set forth in claim 2, wherein said communication device initiates a call based on one of said asynchronous data service and facsimile service with the unmatched dial command string contents operating as a destination telephone number.

4. The system set forth in claim 3, wherein said selected data service option is determined by information included in said matching reserved telephone number sequence.

5. The system set forth in claim 4, wherein said input symbol sequence includes alpha-numeric characters.

6. The system set forth in claim 5, wherein said predetermined symbol sequences include alpha-numeric characters.

7. A method for selecting from a plurality of data service options in a wireless communication system having mobile data service support, said wireless communication system including a terminal device, for originating a call and for transmitting and receiving data in accordance with a selected data service option, and a communication device, coupled to said terminal device for interfacing with said wireless communication system and for sending signaling messages to said terminal device, said method comprising:
   storing, in a memory, a plurality of predetermined symbol sequences including a plurality of reserved telephone number sequences representing different data service options and a plurality of standard telephone numbers;
   inputting a sequence of one or more symbols into said terminal device which represents a dial command string for originating said call, said input symbols sequence includes information indicating a selection of a data service option;
   receiving, in said communication device, said dial command string from said terminal device;
   examining, in said communication device, contents of said received dial command string;
   comparing, in said communication device, contents of said dial command string with said stored predetermined symbol sequences; and
   determining in said communication device, a match between said contents of said dial command string and said stored predetermined symbol sequences,
   wherein said communication device operates in accordance with said selected data service option when said communication device determines that said contents of said dial command string matches one of said reserved telephone number sequences.

8. The method set forth in claim 7, wherein said selected data service option is one of asynchronous data service and facsimile service when said communication device determines that said dial command string contents does not match one of said reserved telephone number sequences.

9. The method set forth in claim 8, wherein said communication device initiates a call based on one of said asynchronous data service and facsimile service with the unmatched dial command string contents operating as a destination telephone number.

10. The method set forth in claim 9, wherein said selected data service option is determined by information included in said matched reserved telephone number sequence.

11. The method set forth in claim 10, wherein said input symbol sequence includes alpha-numeric characters.

12. The method set forth in claim 11, wherein said predetermined symbol sequences include alpha-numeric characters.

13. A mechanism for selecting from a plurality of data service options in a wireless communication system having mobile data service support, said mechanism comprising:
   a terminal device for originating a call and transmitting and receiving data in accordance with a selected data service option, said terminal device including means for inputting a sequence of one or more symbols representing an dial command string for originating said call, wherein said input symbol sequence includes information indicating a selection of a data service option; and a communication device, coupled to said terminal device, for interfacing with said wireless communication system and for sending signaling messages to said terminal device, said communication device including, means for receiving said dial command string from said terminal device, means for examining contents of said received dial command string, means for storing a plurality of predetermined symbol sequences including a plurality of reserved telephone numbers representing different data service options and a plurality of standard telephone numbers, means for comparing contents of said dial command string with said stored pre-determined symbol sequences, and means for determining a match between said contents of said dial command string and said stored predetermined symbol sequences, wherein said communication device operates in accordance with said selected data service option when said communication device determines that said contents of said dial command string matches one of said reserved telephone number sequences.

14. The mechanism set forth in claim 13, wherein said selected data service option is one of asynchronous data service and facsimile service when said communication device determines that said dial command string contents does not match one of said reserved telephone numbers.

15. The method set forth in claim 14, wherein said communication device initiates a call based on one of said asynchronous data service and facsimile service with the unmatched dial command string contents operating as a destination telephone number.

16. The mechanism set forth in claim 15, wherein said selected data service option is determined by information included in said matching reserved telephone number sequence.

17. The mechanism set forth in claim 16, wherein said input symbol sequence includes alpha-numeric characters.

18. The mechanism set forth in claim 17, wherein said predetermined symbol sequences include alpha-numeric characters.

19. A method for selecting from a plurality of data service options in a wireless communication system having mobile data service support, said wireless communication system including a terminal device, for originating a call and for transmitting and receiving data in accordance with a selected data service option, and a communication device, coupled to said terminal device for interfacing with said wireless communication system and for sending signaling messages to said terminal device, said method comprising:

storing, in a memory, a plurality of predetermined symbol sequences including reserved telephone numbers representing different data service options and standard telephone numbers;

inputting a sequence of one or more symbols into said terminal device which represents an AT dial command string for originating said call, said input symbols sequence includes information indicating a selection of a data service option;

receiving, by said communication device, said AT dial command string from said terminal device;

examining, by said communication device, contents of said received AT dial command string;

comparing, by said communication device, contents of said AT dial command string with said stored predetermined symbol sequences; and determining by said communication device, a match between said contents of said AT dial command string and said stored predetermined symbol sequences, wherein said communication device signals said terminal device to transmit data in accordance with said selected data service option when said communication device determines that said contents of AT dial command string matches one of said reserved telephone numbers, said selected data service option being identified by the information included in said matching reserved telephone number, and wherein said selected data service option is one of asynchronous data service and facsimile service when said communication device determines that said AT dial command string contents does not match one of said reserved telephone numbers, said unmatched AT dial command string contents operating as a destination telephone number for said asynchronous data service and facsimile service.

20. The method set forth in claim 19, wherein said input symbol sequence and said predetermined symbol sequences include alpha-numeric characters.

* * * * *